United States Patent
Lee et al.

(10) Patent No.: US 10,172,102 B2
(45) Date of Patent: Jan. 1, 2019

(54) METHOD FOR POWER HEADROOM REPORTING AND DEVICE THEREFOR

(71) Applicant: LG Electronics Inc., Seoul (KR)

(72) Inventors: Sunyoung Lee, Seoul (KR); Seungjune Yi, Seoul (KR); Sungjun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 77 days.

(21) Appl. No.: 15/035,828

(22) PCT Filed: Dec. 8, 2014

(86) PCT No.: PCT/KR2014/011992
§ 371 (c)(1),
(2) Date: May 11, 2016

(87) PCT Pub. No.: WO2015/093768
PCT Pub. Date: Jun. 25, 2015

(65) Prior Publication Data
US 2016/0309423 A1 Oct. 20, 2016

Related U.S. Application Data

(60) Provisional application No. 61/919,809, filed on Dec. 22, 2013.

(51) Int. Cl.
*H04W 52/36* (2009.01)
*H04B 7/26* (2006.01)
(Continued)

(52) U.S. Cl.
CPC ............ *H04W 52/365* (2013.01); *H04B 7/26* (2013.01); *H04J 11/00* (2013.01); *H04L 1/1812* (2013.01);
(Continued)

(58) Field of Classification Search
CPC .................................................. H04W 52/365
See application file for complete search history.

(56) References Cited

U.S. PATENT DOCUMENTS

| 9,713,105 B2* | 7/2017 | Kim | ..................... H04W 52/365 |
| 2012/0113845 A1* | 5/2012 | Kim | ..................... H04L 5/0037 370/252 |

(Continued)

FOREIGN PATENT DOCUMENTS

| JP | 2013520917 A | 6/2013 |
| KR | 1020110137446 A | 12/2011 |

(Continued)

*Primary Examiner* — John D Blanton
(74) *Attorney, Agent, or Firm* — Dentons US LLP

(57) ABSTRACT

The present invention relates to a wireless communication system. More specifically, the present invention relates to a method and a device for transmitting a power headroom reporting in the wireless communication system, the method comprising: generating a PHR MAC CE (Power Headroom Reporting MAC Control Element) to be transmitted to the first BS; and transmitting a power headroom reporting through the PHR MAC CE to the first BS, wherein the PHR MAC CE includes only first PH (Power Headroom) information for activated cells served by the first BS such that second PH information for activated cells served by the second BS is not included.

10 Claims, 14 Drawing Sheets

(51) Int. Cl.
*H04J 11/00* (2006.01)
*H04L 1/18* (2006.01)
*H04L 29/12* (2006.01)
*H04W 64/00* (2009.01)
*H04W 72/04* (2009.01)
*H04W 88/02* (2009.01)
*H04W 88/08* (2009.01)
*H04W 88/16* (2009.01)

(52) U.S. Cl.
CPC ....... *H04L 61/6022* (2013.01); *H04W 64/003* (2013.01); *H04W 72/042* (2013.01); *H04W 72/0413* (2013.01); *H04W 88/02* (2013.01); *H04W 88/08* (2013.01); *H04W 88/16* (2013.01)

(56) References Cited

U.S. PATENT DOCUMENTS

| | | | | |
|---|---|---|---|---|
| 2014/0329551 | A1* | 11/2014 | Ryoo | H04W 76/046 455/522 |
| 2016/0066284 | A1* | 3/2016 | Kwon | H04W 52/365 370/329 |
| 2016/0128003 | A1* | 5/2016 | Callender | H04W 52/365 370/311 |
| 2017/0223641 | A1* | 8/2017 | Haim | H04W 52/248 |

FOREIGN PATENT DOCUMENTS

| | | |
|---|---|---|
| KR | 1020120016987 A | 2/2012 |
| KR | 1020120024953 A | 3/2012 |

\* cited by examiner (a) Control-Plane Protocol Stack (b) User-Plane Protocol Stack Component carrier 5 component carriers → 100 MHz (a) C-Plane connectivity of eNBs involved in dual connectivity (b) U-Plane connectivity of eNBs involved in dual connectivity

METHOD FOR POWER HEADROOM REPORTING AND DEVICE THEREFOR

This application is a 35 USC § 371 National Stage entry of International Application No. PCT/KR2014/011992 filed on Dec. 8, 2014, and claims priority to U.S. Provisional Application No. 61/919,809 filed on Dec. 22, 2013, all of which are hereby incorporated by reference in their entireties as if fully set forth herein.

TECHNICAL FIELD

The present invention relates to a wireless communication system and, more particularly, to a method for power headroom reporting and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for a method for power headroom reporting. The technical problems solved by the present invention are not limited to the above technical problems and those skilled in the art may understand other technical problems from the following description.

Technical Solution

The object of the present invention can be achieved by providing a method for operating by an apparatus in wireless communication system, the method comprising; generating a PHR MAC CE (Power Headroom Reporting MAC Control Element) to be transmitted to the first BS; and transmitting a power headroom reporting through the PHR MAC CE to the first BS, wherein the PHR MAC CE includes only first PH (Power Headroom) information for activated cells served by the first BS such that second PH information for activated cells served by the second BS is not included.

In another aspect of the present invention provided herein is an apparatus in the wireless communication system, the apparatus comprising: an RF (radio frequency) module; and a processor configured to control the RF module, wherein the processor is the processor is configured to generate a PHR MAC CE (Power Headroom Reporting MAC Control Element) to be transmitted to the first BS, and to transmit a power headroom reporting through the PHR MAC CE to the first BS, wherein the PHR MAC CE includes only first PH (Power Headroom) information for activated cells served by the first BS such that second PH information for activated cells served by the second BS is not included.

Preferably, the PHR MAC CE includes a field indicating a presence of second PH information for activated cells served by the second BS set to 0 (zero).

Preferably, the method further comprises: receiving, from at least one of the first BS or the second BS, an indicator indicating whether PH information of all activated cells or PH information of activated cells served by a BS to which the PHR MAC CE is transmitted is included in the PHR MAC CE or not.

Preferably, the first PH information comprises Type 1 PH information indicating a power headroom level of a cell of the activated cells calculated based on a transmission power of a PUSCH (Physical Uplink Shared Channel), and Type 2 PH information indicating a power headroom level of a cell of the of the activated cells calculated based on a transmission power of a PUSCH and a PUCCH (Physical Uplink Control Channel) if one of activated cells served by the first BS is configured to simultaneously transmit PUCCH and PUSCH.

Preferably, the first PH information comprises Type 1 PH information indicating a power headroom level of a cell of the activated cells calculated based on a transmission power of a PUSCH (Physical Uplink Shared Channel) if one of activated cells served by the first BS does is not configured to simultaneously transmit PUCCH and PUSCH.

Preferably, the PHR MAC CE includes a field indicating a presence of first PH information for activated cells served by the first BS set to 1 (one).

It is to be understood that both the foregoing general description and the following detailed description of the present invention are exemplary and explanatory and are intended to provide further explanation of the invention as claimed.

Advantageous Effects

According to the present invention, power headroom reporting can be efficiently performed in a wireless communication system. Specifically, the UE can report power headroom to each base station efficiently in dual connectivity system.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
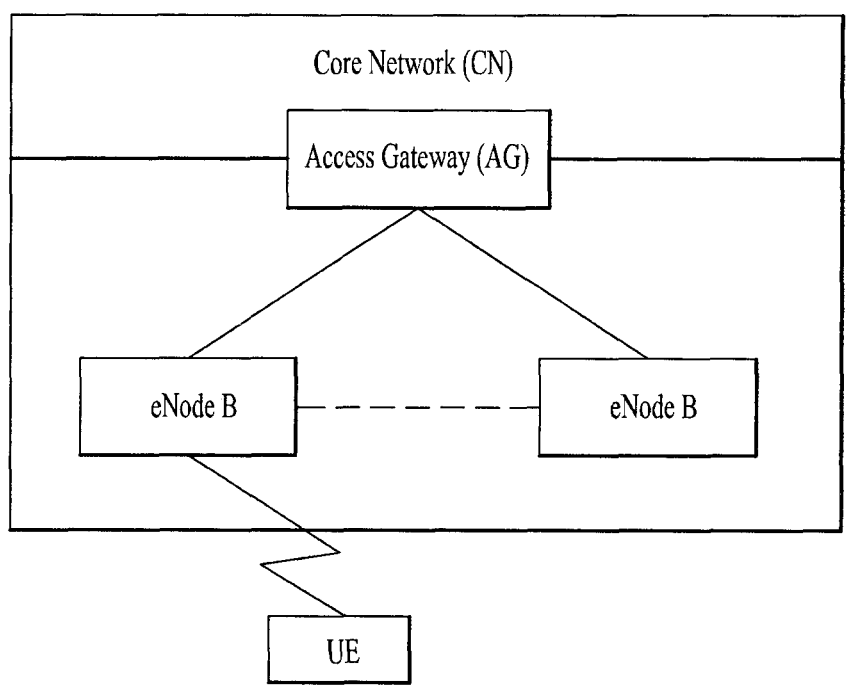
FIG. 1 is a diagram showing a network structure of an Evolved Universal Mobile Telecommunications System (E-UMTS) as an example of a wireless communication system.
Figure 2A:
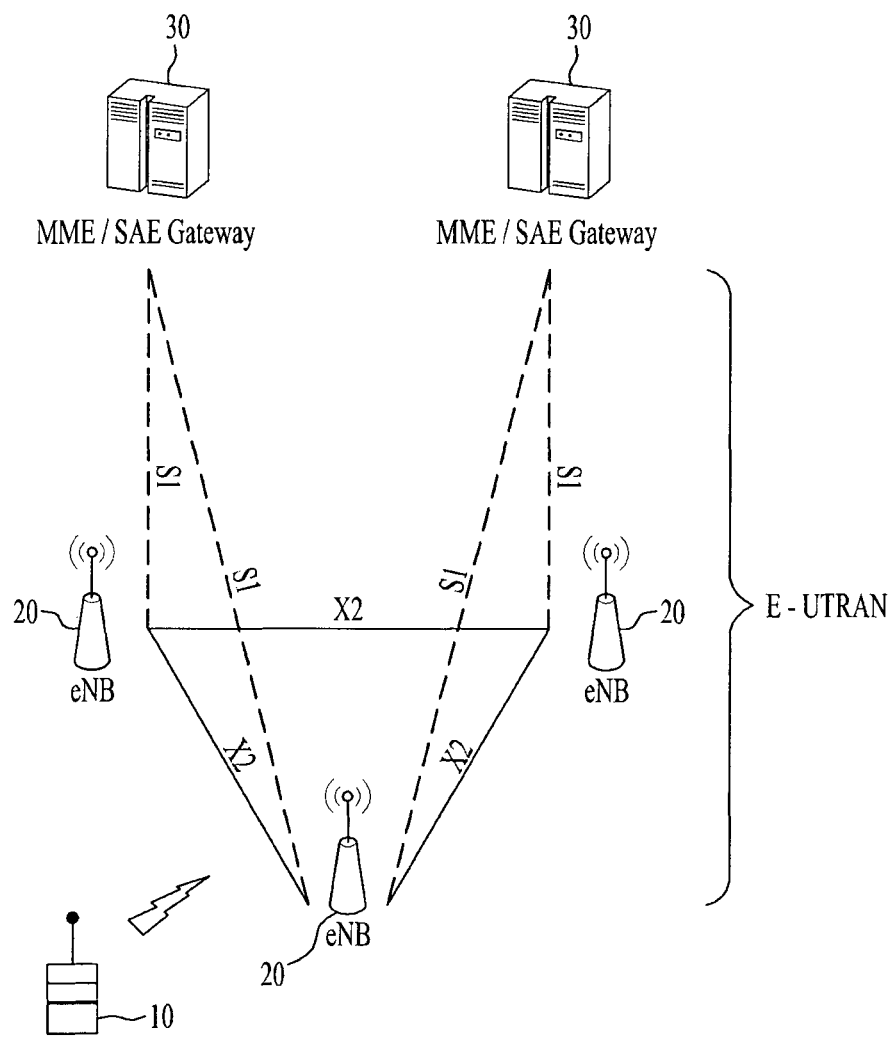
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
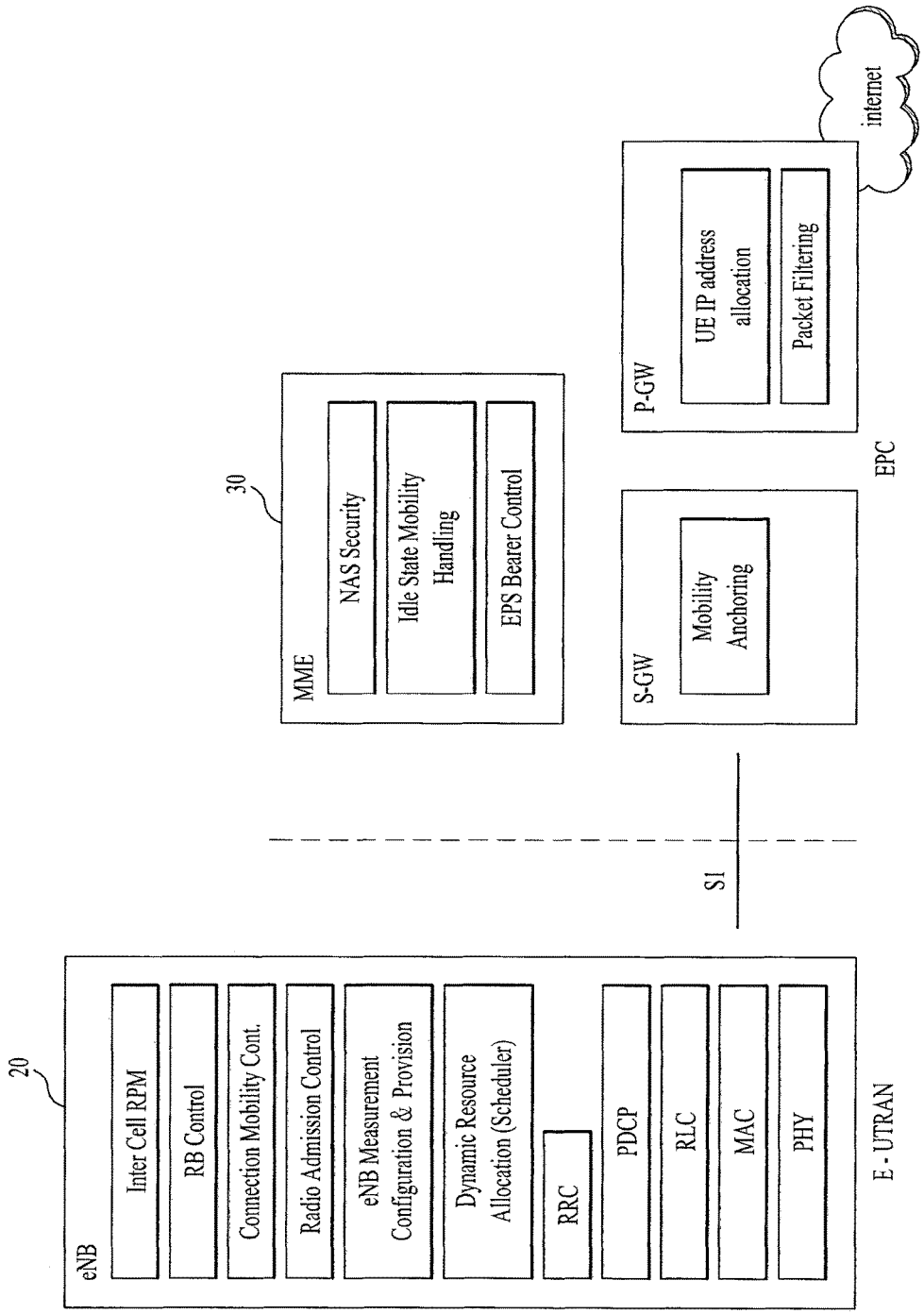
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
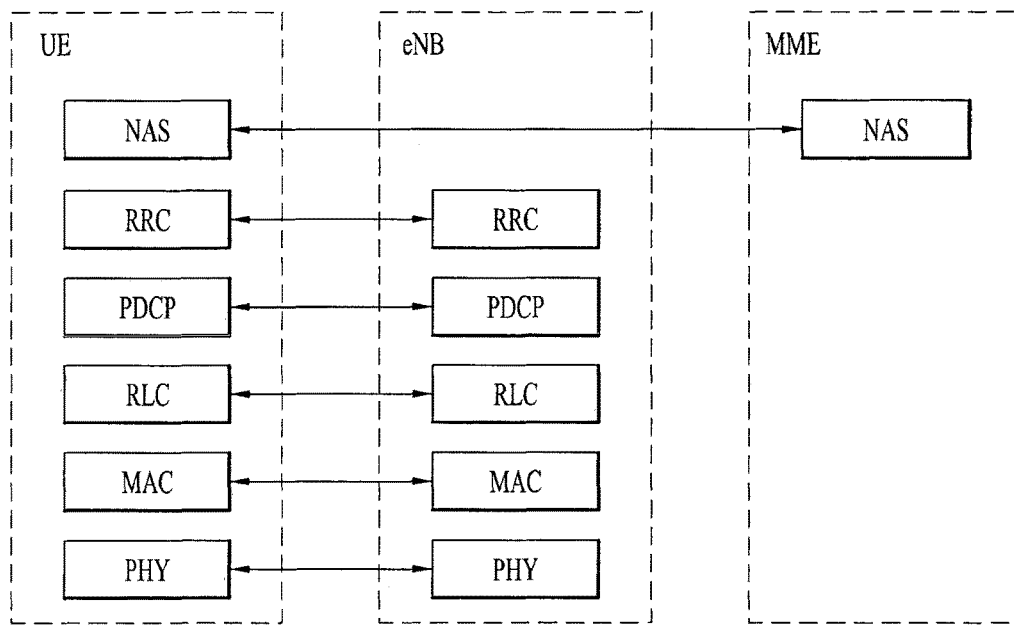
FIG. 3 is a diagram showing a control plane and a user plane of a radio interface protocol between a UE and an E-UTRAN based on a 3rd generation partnership project (3GPP) radio access network standard.
Figure 3:
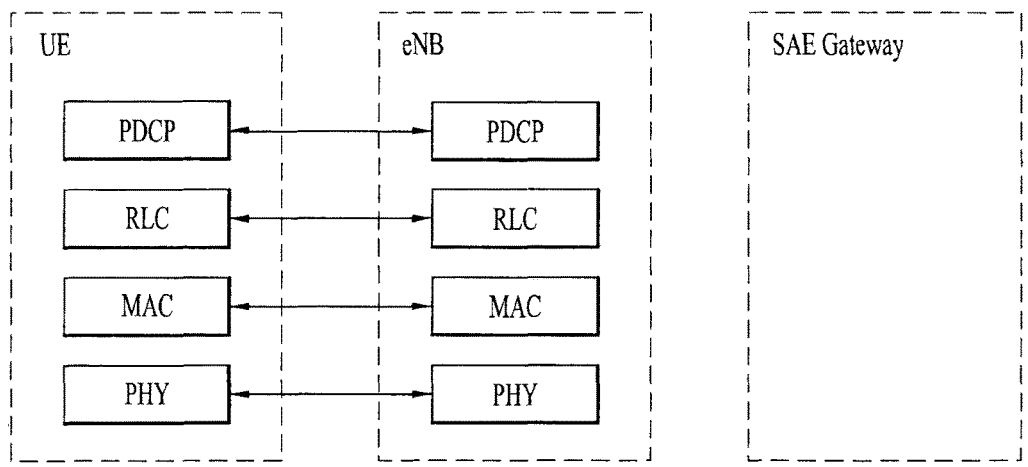

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
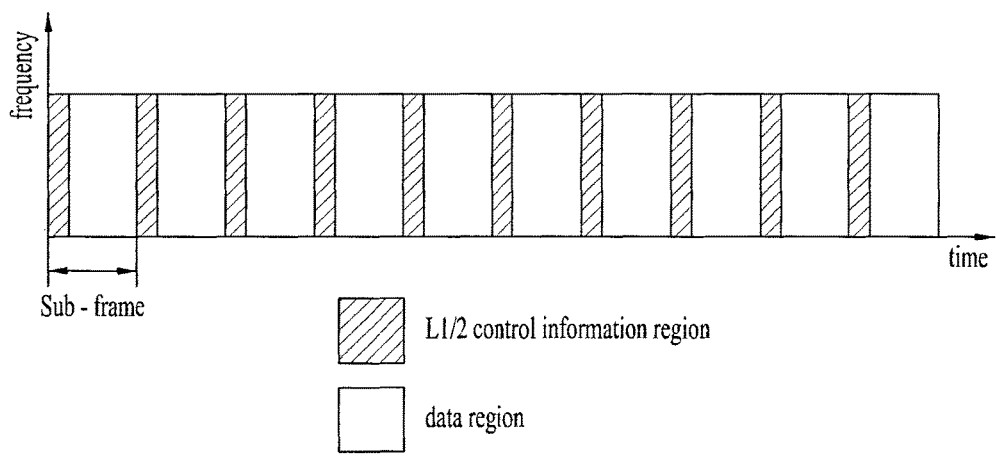
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PD-CCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
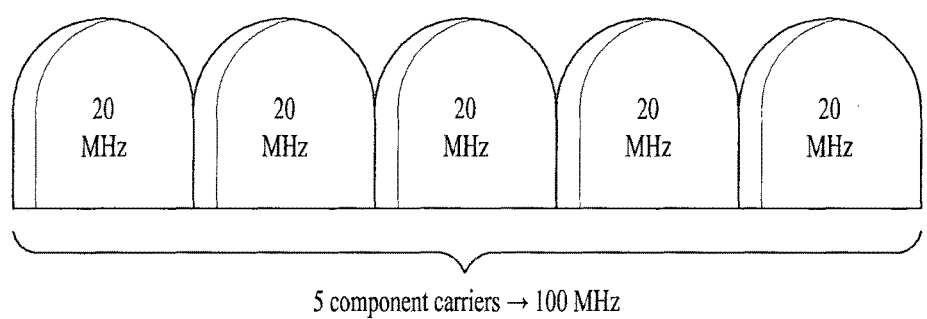
FIG. 5 is a diagram for carrier aggregation.

FIG. 5 is a diagram for carrier aggregation.

Carrier aggregation technology for supporting multiple carriers is described with reference to FIG. 5 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication Type (activation/deactivation) for DL/UL, a secondary component carrier list and the like.

Figure 6:
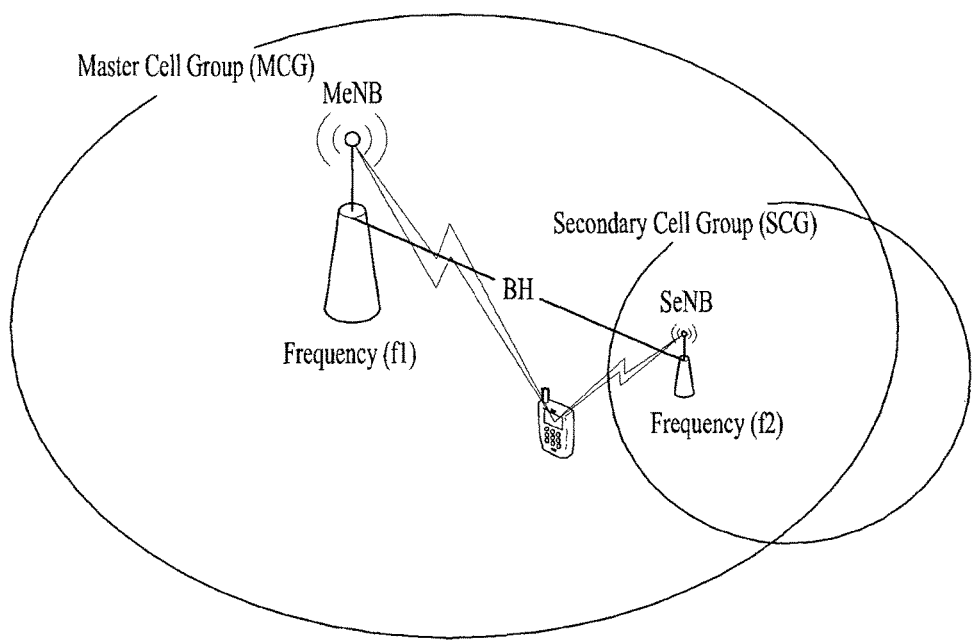
FIG. 6 is a conceptual diagram for dual connectivity between a Master Cell Group (MCG) and a Secondary Cell Group (SCG)

FIG. 6 is a conceptual diagram for Dual Connectivity (DC) between a Master Cell Group (MCG) and a Secondary Cell Group (SCG).

The dual connectivity means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

Above all, the SCG may have a special SCell so called "PSCell" (Primary SCell). Behavior of the PSCell is similar with that of PCell. Thus, the PSCell is the carrier used by a base station to exchange traffic and control signal with a user equipment. In this case, the control signaling may include addition of component carrier, setting for primary component carrier, uplink (UL) grant, downlink (DL) assignment and the like. And random access procedure performs on the PSCell and the PSCell cannot be de-activated. However, because the PSCell is not a PCell, the PSCell cannot be the carrier used by a base station connected with RRC connection.

Figure 7A:
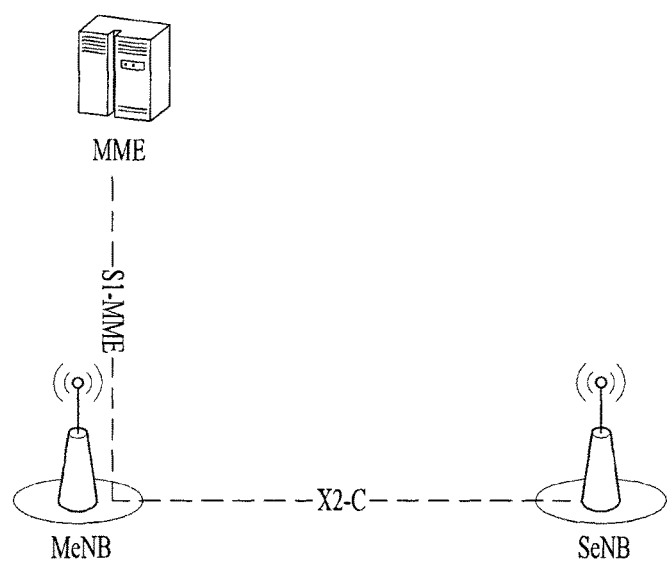
FIG. 7a is a conceptual diagram for C-Plane connectivity of base stations involved in dual connectivity.
Figure 7B:
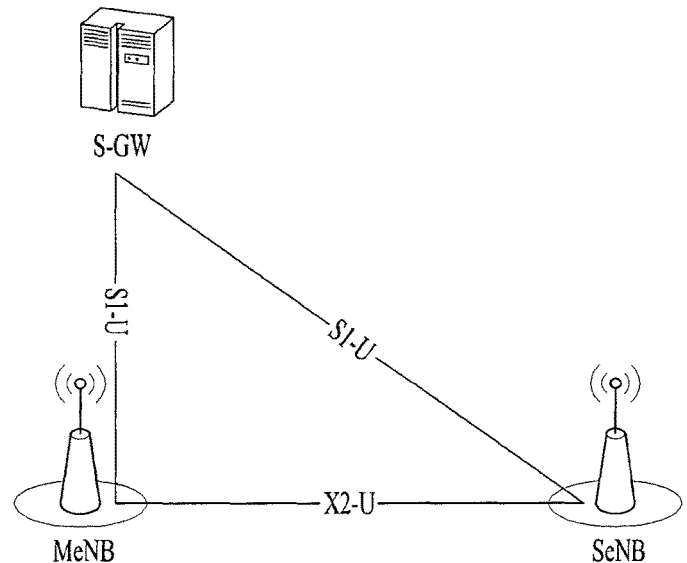
FIG. 7b is a conceptual diagram for U-Plane connectivity of base stations involved in dual connectivity.

FIG. 7a is a conceptual diagram for C-Plane connectivity of base stations involved in dual connectivity, and FIG. 7b is a conceptual diagram for U-Plane connectivity of base stations involved in dual connectivity.

FIG. 7a shows C-plane (Control Plane) connectivity of eNBs involved in dual connectivity for a certain UE. The MeNB is C-plane connected to the MME via S1-MME, the MeNB and the SeNB are interconnected via X2-C (X2-Control plane). As FIG. 7a, Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling.

FIG. 7b shows U-plane connectivity of eNBs involved in dual connectivity for a certain UE. U-plane connectivity depends on the bearer option configured: i) For MCG bearers, the MeNB is U-plane connected to the S-GW via S1-U, the SeNB is not involved in the transport of user plane data, ii) For split bearers, the MeNB is U-plane connected to the S-GW via S1-U and in addition, the MeNB and the SeNB are interconnected via X2-U, and iii) For SCG bearers, the SeNB is directly connected with the S-GW via S1-U. If only MCG and split bearers are configured, there is no S1-U termination in the SeNB. In the dual connectivity, enhancement of the small cell is required in order to data offloading from the group of macro cells to the group of small cells. Since the small cells can be deployed apart from the macro cells, multiple schedulers can be separately located in different nodes and operate independently from the UE point of view. This means that different scheduling node would encounter different radio resource environment, and hence, each scheduling node may have different scheduling results.

Figure 8:
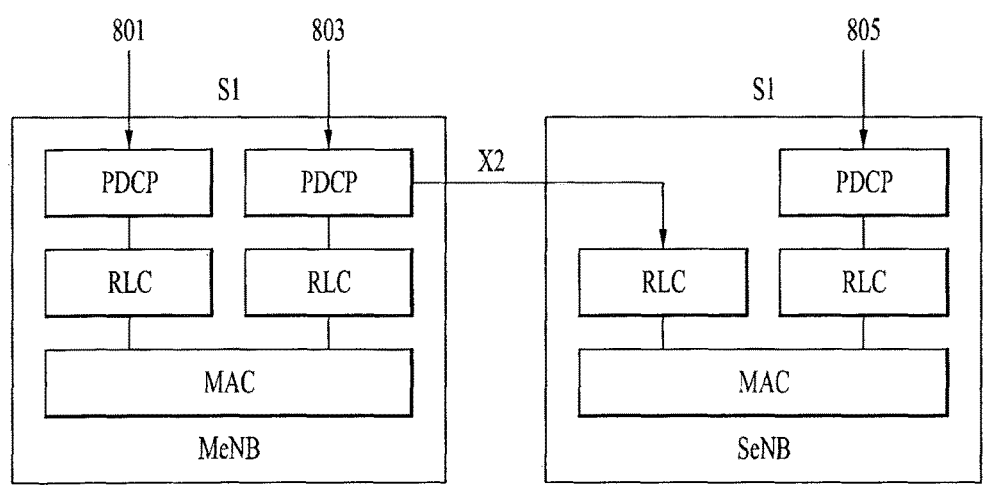
FIG. 8 is a conceptual diagram for radio protocol architecture for dual connectivity.

FIG. 8 is a conceptual diagram for radio protocol architecture for dual connectivity.

E-UTRAN of the present example can support dual connectivity operation whereby a multiple receptions/transmissions (RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity operation, the radio protocol architecture that a particular bearer uses depends on how the bearer is setup. Three alternatives exist, MCG bearer (801), split bearer (803) and SCG bearer (805). Those three alternatives are depicted on FIG. 8. The SRBs (Signaling Radio Bearers) are always of the MCG bearer and therefore only use the radio resources provided by the MeNB. The MCG bearer (801) is a radio protocol only located in the MeNB to use MeNB resources only in the dual connectivity. And the SCG bearer (805) is a radio protocol only located in the SeNB to use SeNB resources in the dual connectivity.

Specially, the split bearer (803) is a radio protocol located in both the MeNB and the SeNB to use both MeNB and SeNB resources in the dual connectivity and the split bearer (803) may be a radio bearer comprising one Packet Data Convergence Protocol (PDCP) entity, two Radio Link Control (RLC) entities and two Medium Access Control (MAC) entities for one direction. Specially, the dual connectivity operation can also be described as having at least one bearer configured to use radio resources provided by the SeNB.

The expected benefits of the split bearer (803) are:
i) the SeNB mobility hidden to CN, ii) no security impacts with ciphering being required in MeNB only, iii) no data forwarding between SeNBs required at SeNB change, iv) offloads RLC processing of SeNB traffic from MeNB to SeNB, v) little or no impacts to RLC, vi) utilization of radio resources across MeNB and SeNB for the same bearer possible, vii) relaxed requirements for SeNB mobility (MeNB can be used in the meantime).

The expected drawbacks of the split bearer (803) are:
i) need to route, process and buffer all dual connectivity traffic in the MeNB, ii) a PDCP entity to become responsible for routing PDCP PDUs towards eNBs for transmission and reordering them for reception, iii) flow control required between the MeNB and the SeNB, iv) in the uplink, logical channel prioritization impacts for handling RLC retransmissions and RLC Status PDUs (restricted to the eNB where the corresponding RLC entity resides) and v) no support of local break-out and content caching at SeNB for dual connectivity UEs.

Figure 9:
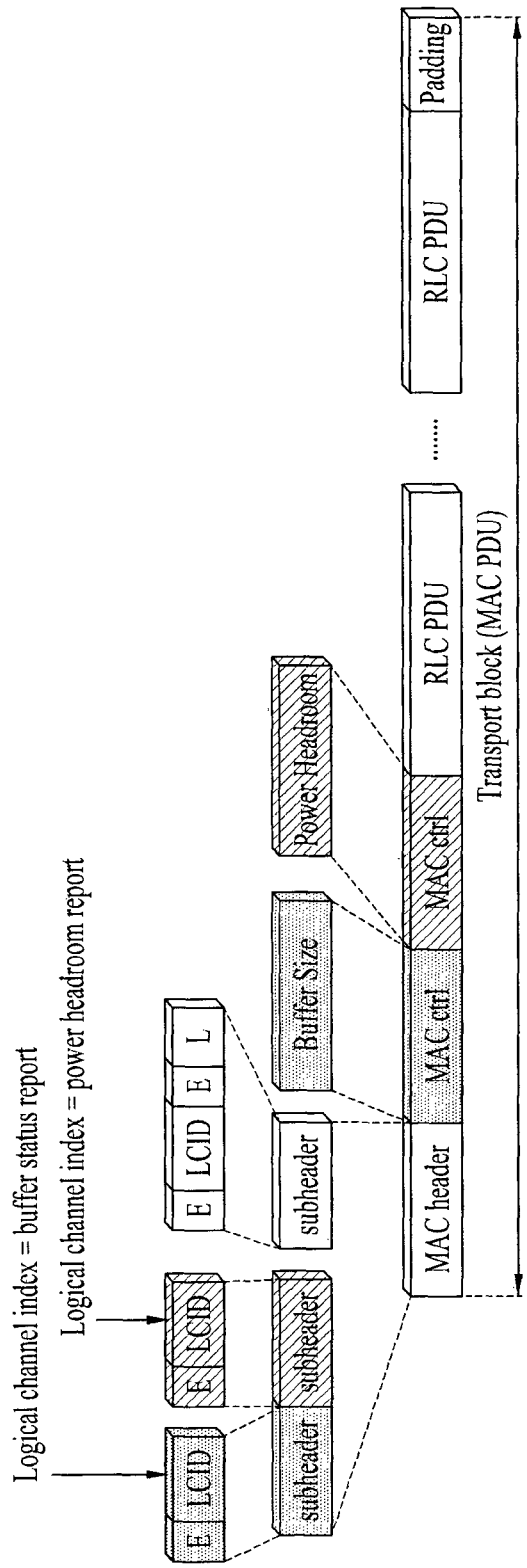
FIG. 9 is a diagram for signaling of buffer status and power-headroom reports.

FIG. 9 is a diagram for signaling of buffer status and power-headroom reports.

The scheduler needs knowledge about the amount of data awaiting transmission from the terminals to assign the proper amount of uplink resources. Obviously, there is no need to provide uplink resources to a terminal with no data to transmit as this would only result in the terminal performing padding to fill up the granted resources. Hence, as a minimum, the scheduler needs to know whether the terminal has data to transmit and should be given a grant. This is known as a scheduling request.

The use of a single bit for the scheduling request is motivated by the desire to keep the uplink overhead small, as a multi-bit scheduling request would come at a higher cost. A consequence of the single bit scheduling request is the limited knowledge at the eNodeB about the buffer situation at the terminal when receiving such a request. Different scheduler implementations handle this differently. One possibility is to assign a small amount of resources to ensure that the terminal can exploit them efficiently without becoming power limited. Once the terminal has started to transmit on the UL-SCH, more detailed information about the buffer status and power headroom can be provided through the inband MAC control message, as discussed below.

Terminals that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The LCID field in one of the MAC subheaders is set to a reserved value indicating the presence of a buffer status report, as illustrated in FIG. 9.

Especially, to assist the scheduler in the selection of a combination of modulation-and-coding scheme and resource size M that does not lead to the terminal being power limited, the terminal can be configured to provide regular power headroom reports on its power usage. There is a separate transmit-power limitation for each component carrier. Thus, power headroom should be measured and reported separately for each component carrier.

There are two different Types of power-headroom reports defined for LTE release 10, Type 1 and Type 2. Type 1 reporting reflects the power headroom assuming PUSCH-only transmission on the carrier, while the Type 2 report assumes combined PUSCH and PUCCH transmission.

The Type1 power headroom valid for a certain subframe, assuming that the terminal was really scheduled for PUSCH transmission in that subframe, is given by the following expression:

$$\text{Power Headroom} = P_{CMAX,c} - (P_{0,PUSCH} + \alpha \cdot PL_{DL} + 10 \cdot \log_{10}(M) + \Delta_{MCS} + \delta), \quad \text{[Equation 1]}$$

Where the values for M and $\Delta_{MCS}$ correspond to the resource assignment and modulation-and-coding scheme used in the subframe to which the power-headroom report corresponds. It can be noted that the power headroom is not a measure of the difference between the maximum per-carrier transmit power and the actual carrier transmit power. It can be seen that the power headroom is a measure of the difference between $P_{CMAX,c}$ and the transmit power that would have been used assuming that there would have been no upper limit on the transmit power. Thus, the power headroom can very well be negative. More exactly, a negative power headroom indicates that the per-carrier transmit power was limited by $P_{CMAX,c}$ at the time of the power headroom reporting. As the network knows what modulation-and-coding scheme and resource size the terminal used for transmission in the subframe to which the power-headroom report corresponds, it can determine what are the valid combinations of modulation-and-coding scheme and resource size M, assuming that the downlink path loss $PL_{DL}$ and the term δ have not changed substantially.

Type-1 power headroom can also be reported for subframes where there is no actual PUSCH transmission. In such cases, 10·log 10 (M) and $\Delta_{MCS}$ in the expression above are set to zero:

$$\text{Power Headroom} = P_{CMAX,c} - (P_{0,PUSCH} + \alpha \cdot PL_{DL} + \delta). \quad \text{[Equation 2]}$$

This can be seen as the power headroom assuming a default transmission configuration corresponding to the minimum possible resource assignment (M=1) and the modulation-and-coding scheme associated with $\Delta_{MCS}$=0 dB.

Similarly, Type 2 power headroom reporting is defined as the difference between the maximum per-carrier transmit power and the sum of the PUSCH and PUCCH transmit power respectively, once again not taking into account any maximum per-carrier power when calculating the PUSCH and PUCCH transmit power.

Similar to Type 1 power headroom reporting, the Type 2 power headroom can also be reported for subframes in which no PUSCH and/or PUCCH is transmitted. In that case a virtual PUSCH and or PUCCH transmit power is calculated, assuming the smallest possible resource assignment (M=1) and $\Delta_{MCS}$=0 dB for PUSCH and $\Delta_{Format}$=0 for PUCCH.

For the uplink, the power availability, or power headroom is defined as the difference between the nominal maximum output power and the estimated output power for UL-SCH transmission. This quantity can be positive as well as negative (on a dB scale), where a negative value would indicate that the network has scheduled a higher data rate than the terminal can support given its current power availability. The power headroom depends on the power-control mechanism and thereby indirectly on factors such as the interference in the system and the distance to the base stations.

Information about the power headroom is fed back from the terminals to the eNodeB in a similar way as the buffer-status reports—that is, only when the terminal is scheduled to transmit on the UL-SCH. Type 1 reports are provided for all component carriers simultaneously, while Type 2 reports are provided for the primary component carrier only.

A power headroom report can be triggered for the following reasons:

Periodically as controlled by a timer.

Change in path loss, since the last power headroom report is larger than a (configurable) threshold.

Instead of padding (for the same reason as buffer-status reports).

It is also possible to configure a prohibit timer to control the minimum time between two power-headroom reports and thereby the signaling load on the uplink.

Figure 10:
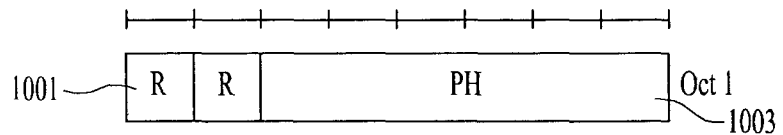
FIG. 10 is a conceptual diagram for PHR MAC CE (Power Headroom Reporting MAC Control CE)

FIG. 10 is a conceptual diagram for PHR MAC CE (Power Headroom Reporting MAC Control CE).

The Power Headroom MAC control element is identified by a MAC PDU subheader with LCID as specified in Table 1. It has a fixed size and consists of a single octet defined as follows by Table 2.

TABLE 1

| Index | LCID values |
|---|---|
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

TABLE 2

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| . . . | . . . |
| 60 | POWER_HEADROOM_60 |

TABLE 2-continued

| PH | Power Headroom Level |
|---|---|
| 61 | POWER_HEADROOM_61 |
| 62 | POWER_HEADROOM_62 |
| 63 | POWER_HEADROOM_63 |

A field of R (1001) is a reserved bit and is set to "0". And a field of PH (1003) indicates the power headroom level. A length of the field of PH (1003) is 6 bits. The reported PH and the corresponding power headroom levels are shown in Table 2 above.

Figure 11:
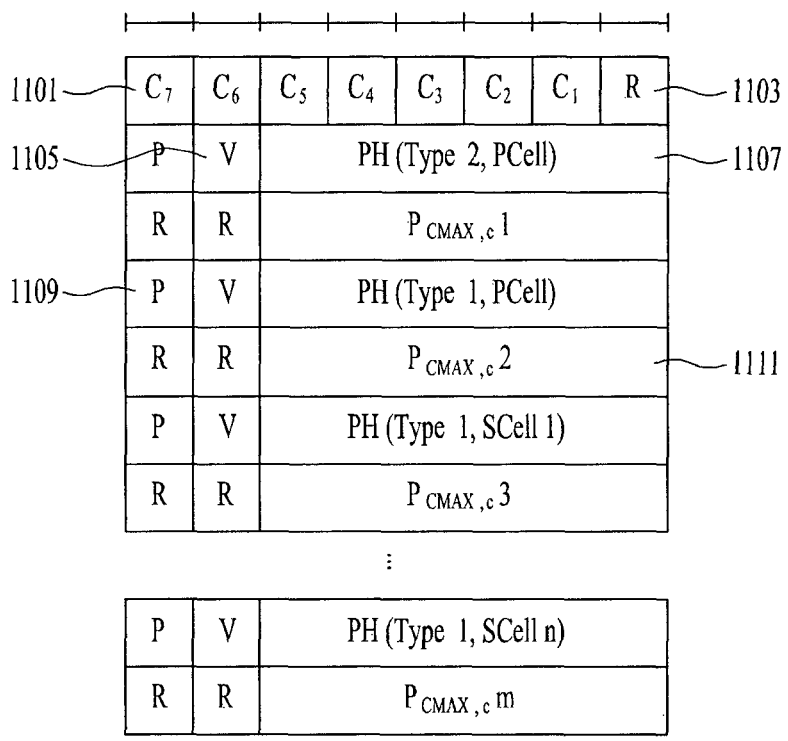
FIG. 11 is a conceptual diagram for Extended PHR MAC CE (Power Headroom Reporting MAC Control CE)

FIG. 11 is a conceptual diagram for Extended PHR MAC CE (Power Headroom Reporting MAC Control CE).

The Extended Power Headroom MAC control element is identified by a MAC PDU subheader with LCID as specified in the Table 1 above. It has a variable size and is defined in FIG. 11. When Type 2 PH is reported, the octet containing the Type 2 PH field is included first after the octet indicating the presence of PH per SCell and followed by an octet containing the associated $P_{CMAX,c}$ field (if reported). Then follows in ascending order based on the Serving Cell Index an octet with the Type 1 PH field and an octet with the associated PCMAX,c field (if reported), for the PCell and for each SCell indicated in the bitmap.

The Extended Power Headroom MAC Control Element is defined as follows:

A field of 'Ci' (1101) indicates the presence of a PH field for the SCell with SCell index i. The Ci field set to "1" indicates that a PH field for the SCell with SCell index i is reported. The Ci field set to "0" indicates that a PH field for the SCell with SCell index i is not reported;

A field of 'R' (1103) is a reserved bit and is set to "0";

A field of 'V' (1105) indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. Furthermore, for both Type 1 and Type 2 PH, V=0 indicates the presence of the octet containing the associated $P_{CMAX,c}$ field, and V=1 indicates that the octet containing the associated $P_{CMAX,c}$ field is omitted;

A field of 'PH' (1107) indicates the power headroom level. The length of the field is 6 bits. The reported PH and the corresponding power headroom levels are shown in Table 2

A field of 'P' (1109) indicates whether the UE applies power backoff due to power management as allowed by P-MPRc. The UE shall set P=1 if the corresponding $P_{CMAX,c}$ field would have had a different value if no power backoff due to power management had been applied;

A field of '$P_{CMAX,c}$' (1111) if present, this field indicates the $P_{CMAX,c}$ or $\tilde{P}_{CMAX,c}[2]$ used for calculation of the preceding PH field. The reported $P_{CMAX,c}$ and the corresponding nominal UE transmit power levels are shown in Table 3.

If the UE has UL resources allocated for new transmission for a TTI and If the UE is configured to simultaneous PUCCH-PUSCH transmission, the Extended Power Headroom MAC Control Element includes a value of a Type 2 power headroom for the cell in the field of PH in a TTI. In this case, if the UE has a PUCCH transmission in the TTI, the Extended Power Headroom MAC Control Element includes a value of the corresponding $P_{CMAX,c}$ field from a physical layer;

TABLE 3

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

For the prior art, the PUCCH is configured only in one cell (i.e. PCell) for the UE even if multiple cells are configured with uplink. Therefore, in the Extended PHR MAC CE, Type 1 PH is reported for all serving cells, but Type 2 PH is reported only for PCell. The Type 1 PH is the power headroom calculated by considering only PUSCH transmission, and the Type 2 PH is the power headroom calculated by considering both PUCCH and PUSCH transmissions.

In Dual Connectivity mentioned above, the PUCCH is decided to be used for at least one serving cell controlled by the SeNB. The reason is that since the MeNB and the SeNB is linked with non-ideal backhaul, the SeNB cannot schedule for the UE based on the PUCCH transmitted to the MeNB. If simultaneous PUCCH-PUSCH transmission is configured for serving cells other than PCell, the PHR should be changed to reflect this aspect.

Figure 12:
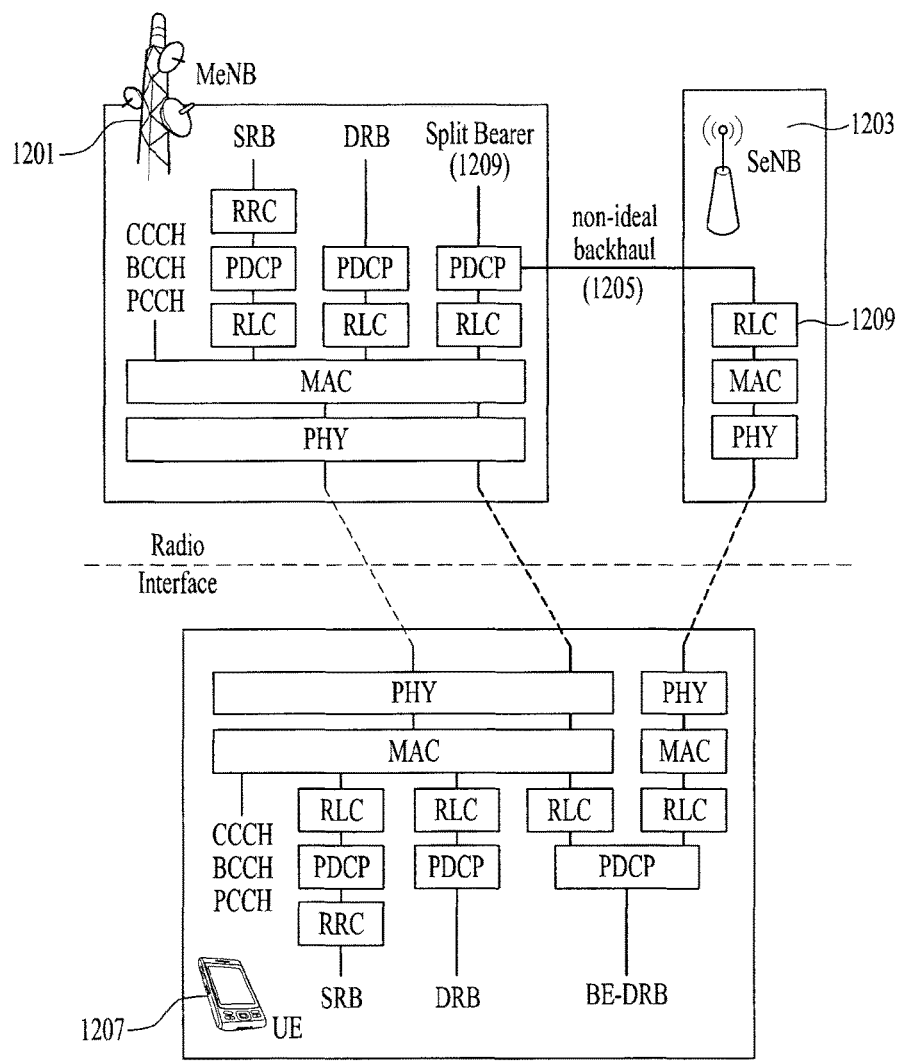
FIG. 12 is a conceptual diagram for one of radio protocol architecture for dual connectivity.

FIG. 12 is a conceptual diagram for one of radio protocol architecture for dual connectivity.

In LTE Rel-12, a new study on dual connectivity, i.e. UE is connected to both MeNB (1201) and SeNB (1203), as shown in FIG. 12. In this figure, the interface between MeNB (1201) and SeNB (1203) is called Xn interface (1205). The Xn interface (1205) is assumed to be non-ideal; i.e. the delay in Xn interface could be up to 60 ms, but it is not limited thereto.

To support dual connectivity, one of the potential solutions is for the UE (1207) to transmit data to both MCG and SCG utilizing a new RB structure called dual RLC/MAC scheme, where a single RB has one PDCP—two RLC—two MAC for one direction, and RLC/MAC pair is configured for each cell, as shown in FIG. 12. This scheme is called "Split Bearer" scheme (S1209).

In order to increase the throughput or offload the traffic, the UE may have a dual connectivity with two separate eNBs, i.e., the MeNB (1201) and the SeNB (1203). As the UE is connected to both of the MeNB (1201) and the SeNB (1203), there are separate two MAC entities corresponding to each eNB in the UE side, e.g., M-MAC for the MeNB and S-MAC for the SeNB.

Meanwhile, the UE reports the power headroom (PH) information to the eNB in order for the eNB to allocate more resource to the UE unless the allocated resource does not exceed the amount of resource that UE can support given the UE's maximum transmission power. In detail, the UE reports all activated serving cells configured for the UE to the eNB using MAC signaling, i.e., PHR MAC CE. When the UE reports the PH information of cells to the corresponding eNB, as the eNB is aware of the scheduling information as well as the power headroom of the UE, the eNB can assess the exact power status of the UE.

In dual connectivity, the UE can be connected to more than one eNBs and scheduled by them. If multiple serving cells are configured for the UE with dual connectivity, some serving cells are served by one eNB and the other serving cells are served by the other eNB. For example, Master Cell Group (MCG) is served by the MeNB while Secondary Cell Group (SCG) is served by the SeNB. As there can be a delay in exchanging scheduling information between different eNBs, one eNB may not know the scheduling information of other eNB. In this case, it is not useful to report PH of serving cells that are served by one eNB to the other eNB because PH information by itself is not helpful for understanding the exact power status of the UE. Therefore, in dual connectivity, it is likely that the UE reports the PH of the activated cells only to the eNB where the activated cells are belonging to.

In the current specification, Extended Power Headroom MAC Control Element is used to report the power headroom of multiple cells, where Ci field indicating the presence of a PH field for the SCell with SCell Index i and PH field indicates the power headroom level. In case the UE reports the PH of only activated cells that are belonging to the corresponding eNB, it is not specified how to set the Ci field for the activated cells that are belonging to the other eNB.

Figure 13:
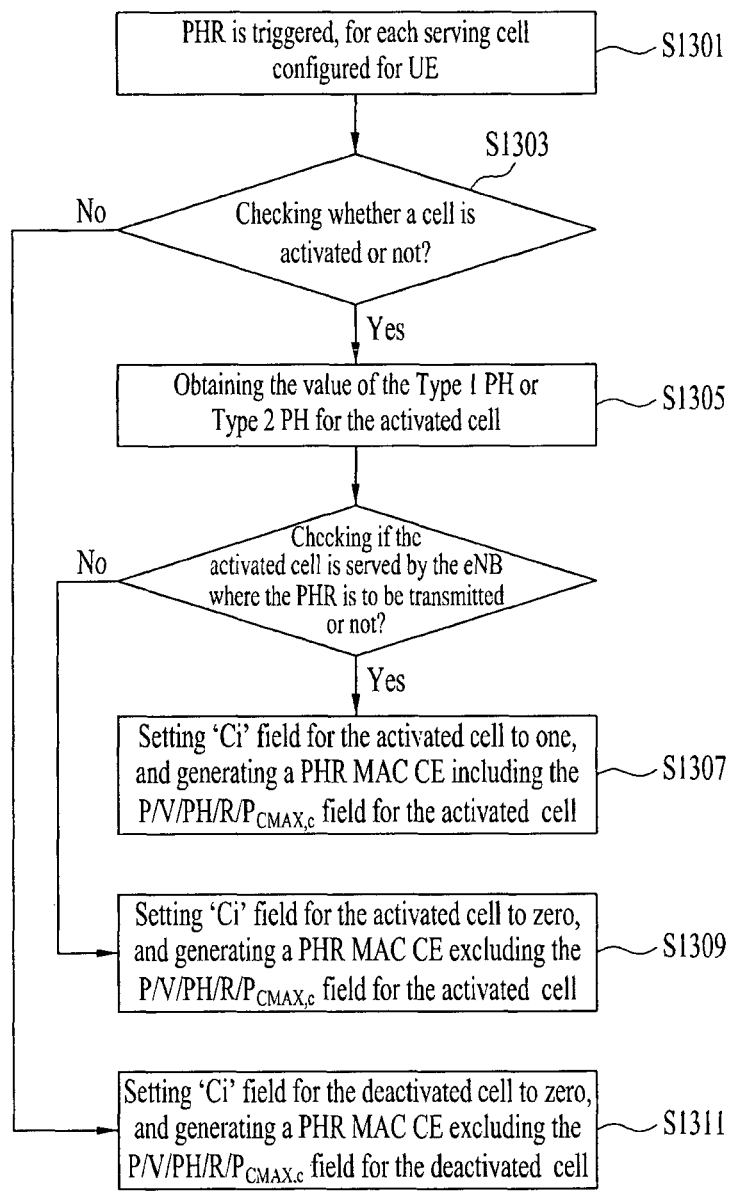
FIG. 13 is a conceptual diagram for transmitting Power Headroom Reporting according to embodiments of the present invention.

FIG. 13 is a conceptual diagram for transmitting Power Headroom Reporting according to embodiments of the present invention.

The UE can be connected to both the MeNB and the SeNB at the same time in a dual connectivity. The MCG is a group of serving cells associated with the MeNB, comprising of a PCell and optionally one or more SCells. And the SCG is a group of serving cells associated with the SeNB, comprising of the special SCell and optionally one or more SCells. The special SCell may be a PSCell.

In this invention, if the UE supports dual connectivity, when the UE reports the PH to one eNB, the UE sets the Ci field of the PHR MAC CE to zero for the activated cells served by the other eNB. As a consequence, when the UE reports the PH tone eNB, the PN/PH/R/$P_{CMAX,c}$ field for the cell served by the other eNB is not included in the PHR MAC CE.

The following steps are used to realize the invention;

The UE is configured with multiple serving cells by different eNBs. Some of the serving cells are configured by one eNB and the other serving cells are configured by the other eNB. If the PHR is triggered (S1301), for each serving cell configured for the UE, the UE checks whether the cell is activated or not (S1303).

If the cell is activated, the UE obtains the value of the Type 1 PH or Type 2 PH according to the PUSCH/PUCCH configuration (S1305).

If the cell is served by the eNB where the PHR is to be transmitted, the UE sets Ci field for the cell to one, and the UE generates the PHR MAC CE including the PN/PH/R/$P_{CMAX,c}$ field for the cell (S1307).

If the cell is not served by the eNB where the PHR is to be transmitted, the UE sets Ci field for the cell to zero, and the UE generates the PHR MAC CE excluding the P/V/PH/R/$P_{CMAX,c}$ field for the cell (S1309).

Here, an expression of 'the eNB serving the cell' means one of the eNB manages the radio resource of the cell; or the eNB manages the RRC connection or radio bearer of the UEs under the cell; or the eNB transmits/receives the control information of the cell; or the eNB transmits/receives the data on the cell.

If the cell is not activated, the UE sets Ci field for the cell to zero, and the UE generates the PHR MAC CE excluding the PN/PH/R/$P_{CMAX,c}$ field for the cell (S1311).

For example, when the UE generates the PHR MAC CE to be transmitted to the eNB by which a PCell is not served, the UE can exclude the P/V/PH/R/$P_{CMAX,c}$ field reserved for the PCell.

Figure 14:
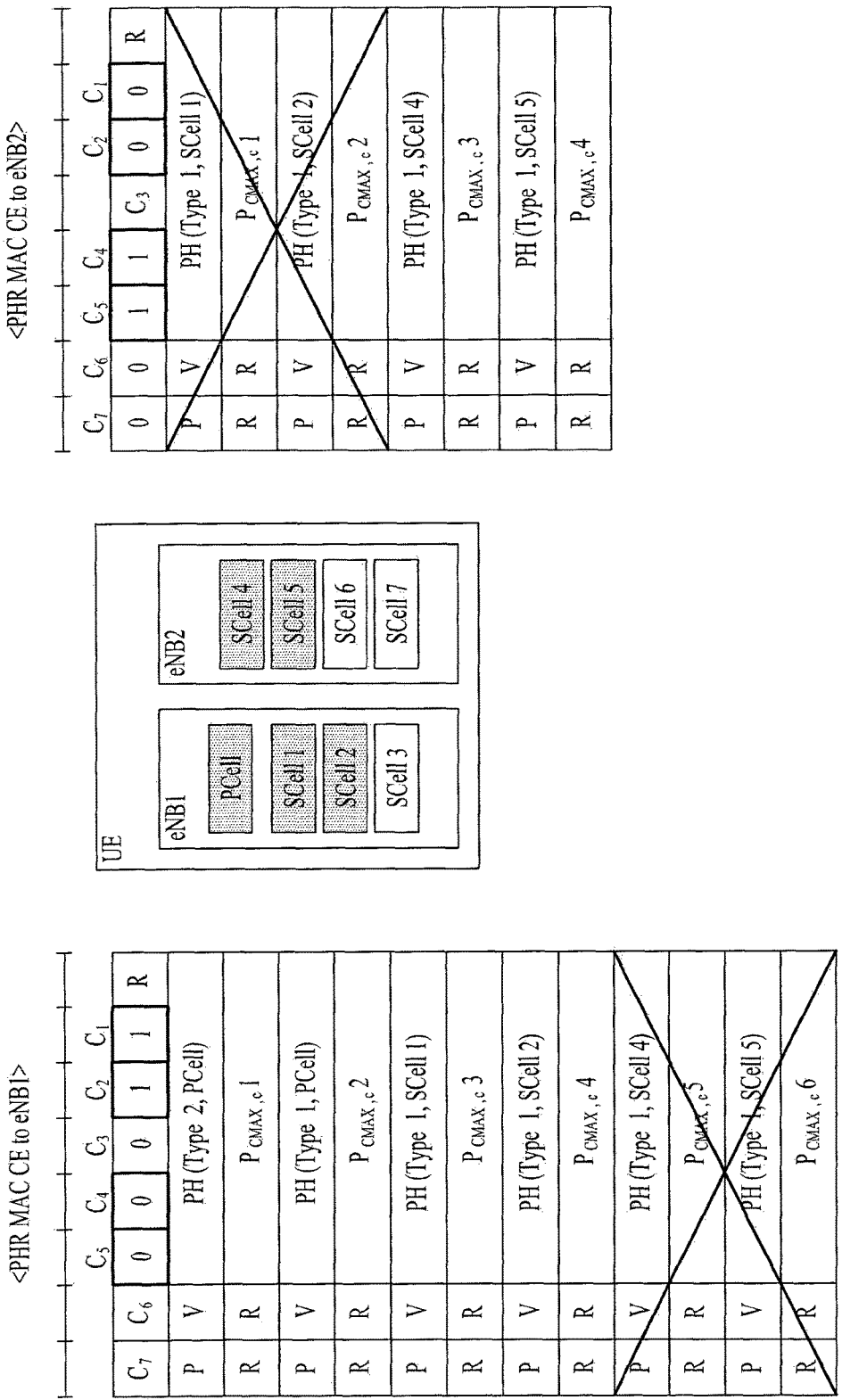
FIGS. 14 to 15 are conceptual diagrams for Extended PHR MAC CE (Power Headroom Reporting MAC Control CE) generated according to embodiments of the present invention.

FIG. 14 is a conceptual diagram for Extended PHR MAC CE (Power Headroom Reporting MAC Control CE) generated according to embodiments of the present invention.

The FIG. 14 shows an example of generating a PHR MAC CE when the UE transmits PHR to one eNB while connected to eNB1 and eNB2 by setting the Ci field for the activated cells served by the other eNB to zero.

In this example, the UE is configured with PCell, SCell1, SCell2, and SCell3 that are served by the eNB1, while with SCell4, SCell5, SCell6, and SCell7 that are served by the eNB2. Regarding FIG. 14, the cells with green box (PCell, SCell1, SCell2, SCell4, and SCell5) are activated cells while the other cells with white box (SCell3, SCell6, and SCell7) are not activated.

If the PHR is triggered by the SCell1, the UE reports the power headroom only to the eNB1 because the SCell1 is served by the eNB1. In order to report the power headroom to the eNB1, the UE obtains the power headroom for the activated cells configured for the UE. In the UE side, the SCell4 and SCell5 are activated but not served by the eNB1. Therefore, the UE does not need to report the power headroom for the SCell4 and SCell5 to the eNB1. In order not to include the power headroom information of the SCell4 and SCell5 in the PHR MAC CE to be transmitted to the eNB1, the UE sets the C4 and C5 to zero. For the activated cells served by the eNB1, i.e., SCell1 and SCell2, the UE sets Ci field to one and includes the PN/PH field and optionally R/$P_{CMAX,c}$ field.

Similarly, if the PHR is triggered by the SCell4, the UE reports the power headroom only to the eNB2 including the PH information of the activated cells served by the eNB2, i.e., SCell4 and SCell5. In order not include the PH information for the activated cells served by eNB1, i.e., SCell1 and SCell2, the UE sets Ci for those cells, i.e., C1 and C2, to zero. Also, in this example, the UE generates the PHR MAC CE by excluding the P/V/PH/R/PCMAX,c field that is reserved for the PCell since the PCell is not served by the eNB2.

Figure 15:
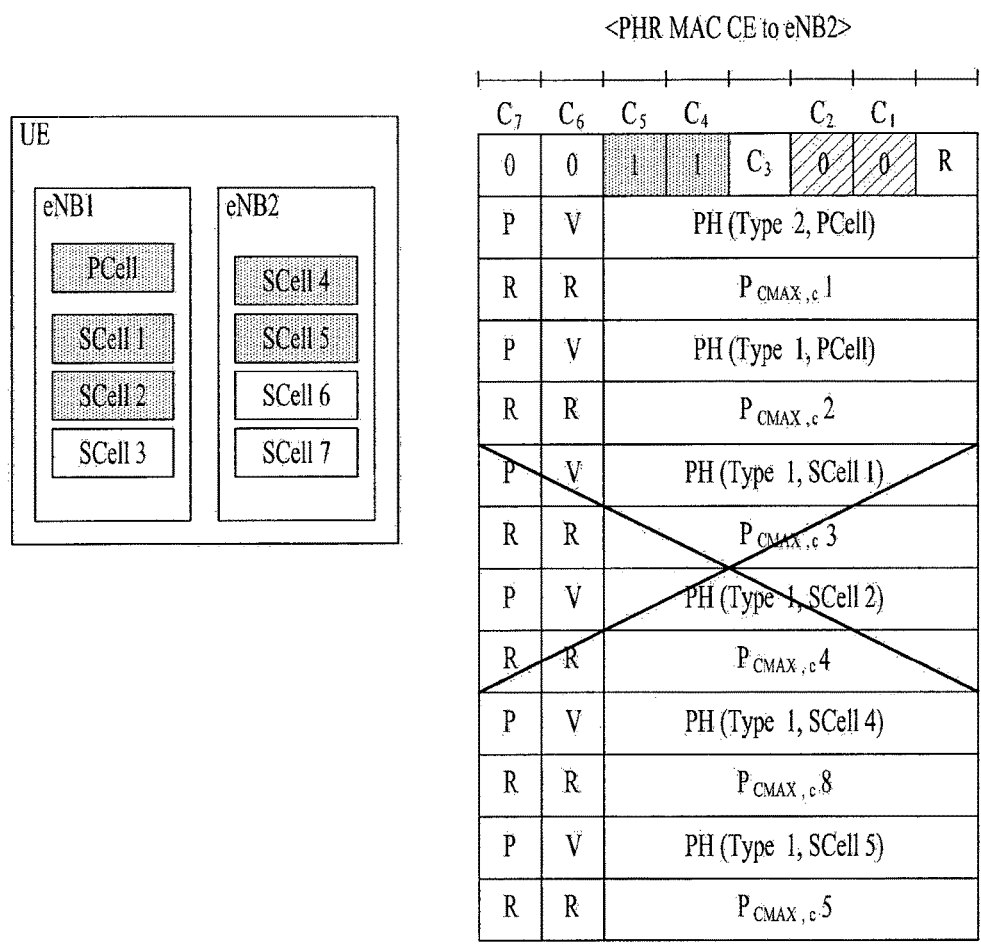

FIG. 15 is a conceptual diagram for Extended PHR MAC CE (Power Headroom Reporting MAC Control CE) generated according to embodiments of the present invention.

FIG. 15 is an example of another invention that when the PCell is not served by the eNB2, the UE generates the PHR MAC CE for the eNB2 by including the P/V/PH/R/$P_{CMAX,c}$ field for the PCell served by the eNB1.

It that case, if the PHR is triggered by the SCell4, the UE reports the power headroom only to the eNB2 including the PH information of the activated cells served by the eNB2, i.e., SCell4 and SCell5. And additionally, in this example, the UE generates the PHR MAC CE by excluding the PN/PH/R/$P_{CMAX,c}$ field that is reserved for the PCell PCell although the PCell is not served by the eNB2. In order not include the PH information for the activated cells served by eNB1, i.e., SCell1 and SCell2, the UE sets Ci for those cells, i.e., C1 and C2, to zero.

Additionally, the UE can receive from at least one of the eNB1 or the eNB2, an indicator indicating whether PH information of all activated cells or PH information of activated cells served by a eNB to which the PHR MAC CE is transmitted is included in the PHR MAC CE or not.

Figure 16:
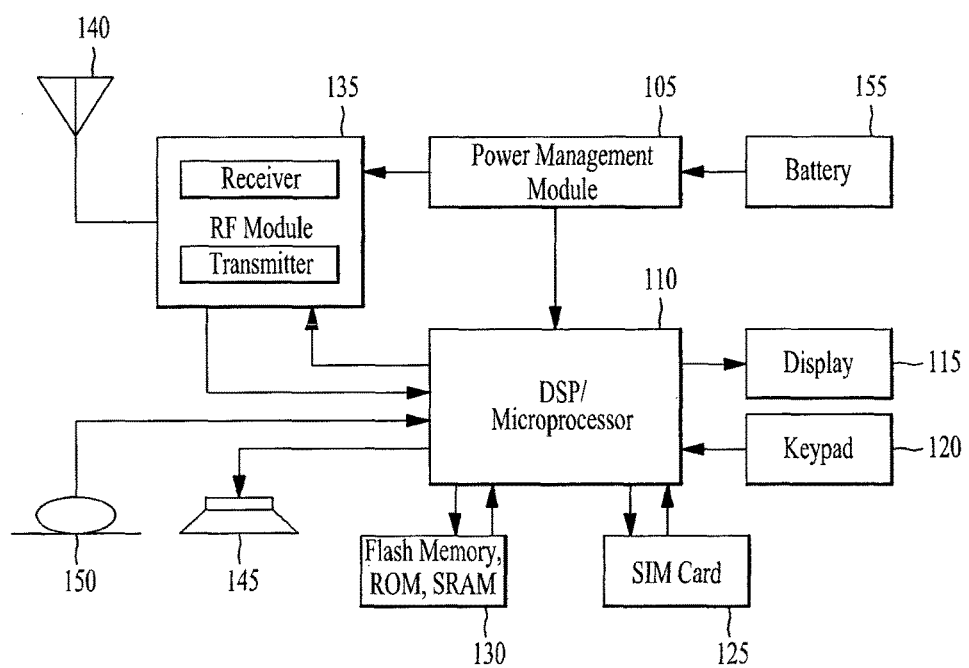
FIG. 16 is a block diagram of a communication apparatus according to an embodiment of the present invention.

FIG. 16 is a block diagram of a communication apparatus according to an embodiment of the present invention.

The apparatus shown in FIG. 16 can be a user equipment (UE) and/or eNB adapted to perform the above mechanism, but it can be any apparatus for performing the same operation.

As shown in FIG. 16, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 16 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 16 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for operating a User Equipment (UE) connected with a first Base Station (BS) and a second BS in a wireless communication system, the method comprising:
generating a Power Headroom Reporting (PHR) Medium Access Control (MAC) Control Element (CE) when PHR to be transmitted to the first BS is triggered, wherein a primary cell (PCell) is not served by the first BS,
wherein a first serving cell, which is served by the first BS, and a second serving cell are activated in the UE; and
transmitting a MAC Protocol Data Unit (PDU) including the generated PHR MAC CE to the first BS,
wherein when the second serving cell is served by the first BS, the PHR MAC CE includes Power Headroom (PH) information for the PCell, PH information for the first serving cell and PH information for the second serving cell,
wherein when the second serving cell is not served by the first BS, the PHR MAC CE includes the PH information for the PCell and the PH information for the first serving cell without the PH information for the second serving cell, even though the second serving cell is activated.

2. The method according to claim 1, wherein when the second serving cell is not served by the first BS, a value of a Ci field associated with the second serving cell in the PHR MAC CE is set to 0, even though the second serving cell is activated.

3. The method according to claim 1, wherein a value of a Ci field associated with the first serving cell in the PHR MAC CE is set to 1.

4. The method according to claim 1, wherein when the PHR MAC CE includes the PH information for the PCell, the PH information for the first serving cell and the PH information for the second serving cell, an octet containing a Type 2 PH field is included first after an octet indicating presence of PH per SCell and followed by an octet containing an associated $P_{CMAX,c}$ field, and the octet containing a Type 2 PH field is followed by an octet with a Type 1 PH field for the PCell, the first serving cell and the second serving cell, in ascending order based on the ServCellIndex.

5. The method according to claim 1, wherein when the PHR MAC CE includes the PHR information for the PCell and the PH information for the first serving cell without the PH information for the second serving cell, an octet containing a Type 2 PH field is included first after an octet indicating presence of PH per SCell and followed by an octet containing an associated $P_{CMAX,c}$ field, and the octet containing a Type 2 PH field is followed by an octet with a Type 1 PH field for the PCell and the first serving cell.

6. A User Equipment (UE) connected with a first BS (base station) and a second BS, operating in a wireless communication, the UE comprising:
   a receiver and a transmitter; and
   a processor, operably coupled to the receiver and the transmitter, that:
   generates a Power Headroom Reporting (PHR) Medium Access Control (MAC) Control Element (CE) when PHR to be transmitted to the first BS is triggered, wherein a primary cell (PCell) is not served by the first BS,
   wherein a first serving cell, which is served by the first BS, and a second serving cell are activated in the UE, and
   controls the transmitter to transmit a MAC Protocol Data Unit (PDU) including the generated PHR MAC CE to the first BS,
   wherein when the second serving cell is served by the first BS, the PHR MAC CE includes Power Headroom (PH) information for the PCell, PH information for the first serving cell and PH information for the second serving cell, and
   wherein when the second serving cell is not served by the first BS, the PHR MAC CE includes the PH information for the PCell and the PH information for the first serving cell without the PH information for the second serving cell, even though the second serving cell is activated.

7. The UE according to claim 6, wherein when the second serving cell is not served by the first BS, a value of a Ci field associated with the second serving cell in the PHR MAC CE is set to 0, even though the second serving cell is activated.

8. The UE according to claim 6, wherein a value of a Ci field associated with the first serving cell in the PHR MAC CE is set to 1.

9. The UE according to claim 6, wherein when the PHR MAC CE includes the PHR information for the PCell, the PH information for the first serving cell and the PH information for the second serving cell, an octet containing a Type 2 PH field is included first after an octet indicating presence of PH per SCell and followed by an octet containing an associated PCMAX,c field, and the octet containing a Type 2 PH field is followed by an octet with a Type 1 PH field for the PCell, the first serving cell and the second serving cell, in ascending order based on the ServCellIndex.

10. The UE according to claim 6, wherein when the PHR MAC CE includes the PHR information for the PCell, and the PH information for the first serving cell without the PH information for the second serving cell, an octet containing a Type 2 PH field is included first after an octet indicating presence of PH per SCell and followed by an octet containing an associated PCMAX,c field, and the octet containing a Type 2 PH field is followed by an octet with a Type 1 PH field for the PCell and the first serving cell.

* * * * *